(12) United States Patent
Shah et al.

(10) Patent No.: US 6,783,750 B2
(45) Date of Patent: Aug. 31, 2004

(54) HYDROGEN PRODUCTION METHOD

(75) Inventors: Minish Mahendra Shah, East Amherst, NY (US); Raymond Francis Drnevich, Clarence Center, NY (US); Christian Friedrich Gottzmann, Clarence, NY (US); Bart Antonie van Hassel, Getzville, NY (US)

(73) Assignee: Praxair Technology, Inc., Danbury, CT (US)

(*) Notice: Subject to any disclaimer, the term of this patent is extended or adjusted under 35 U.S.C. 154(b) by 324 days.

(21) Appl. No.: 09/933,901

(22) Filed: Aug. 22, 2001

(65) Prior Publication Data

US 2003/0039608 A1 Feb. 27, 2003

(51) Int. Cl.$^7$ .............................. C01B 3/24; C01B 3/26
(52) U.S. Cl. ...................... 423/652; 252/373; 423/650; 423/651
(58) Field of Search ................ 252/373; 423/648.1, 423/650, 651, 652, 653, 654

(56) References Cited

U.S. PATENT DOCUMENTS

| | | | |
|---|---|---|---|
| 3,350,846 A | 11/1967 | Makrides et al. | 55/16 |
| 4,810,485 A | 3/1989 | Marianowski et al. | 423/648.1 |
| 5,215,729 A | 6/1993 | Buxbaum | 423/248 |
| 5,217,506 A | 6/1993 | Edlund et al. | 55/16 |
| 5,415,891 A | 5/1995 | Liu et al. | 427/243 |
| 5,637,259 A | 6/1997 | Galuszka et al. | 252/373 |
| 5,652,020 A | 7/1997 | Collins et al. | 427/230 |
| 5,702,999 A | 12/1997 | Mazanec et al. | 501/152 |
| 5,712,220 A | 1/1998 | Carolan et al. | 502/400 |
| 5,733,435 A | 3/1998 | Prasad et al. | 205/765 |
| 5,738,708 A | 4/1998 | Peachey et al. | 95/56 |
| 5,741,474 A | 4/1998 | Isomura et al. | 423/648.1 |
| 6,037,514 A | 3/2000 | White et al. | 585/520 |
| 6,066,307 A | 5/2000 | Keskar et al. | 423/648.1 |

OTHER PUBLICATIONS

Iwahara, "Hydrogen Pumps Using Proton–Conducting Ceramics and Their Applications", Solid State Ionics 125, pp 271–278 (1999).
Balachandran et al., "Development of Mixed–Conducting Ceramic Membrane for Hydrogen Separation", manuscript created by University of Chicago (Aug., 1999).
DeLallo et al., "Decarbonized Fuel from Coal, Plant Review", Sixteenth Annual International Pittsburgh Coal Conference Proceedings, pp 1–15 (Oct., 1999).

Primary Examiner—Wayne A. Langel
(74) Attorney, Agent, or Firm—David M. Rosenblum

(57) ABSTRACT

A method of producing hydrogen in which oxygen is separated from an oxygen containing stream to produce an oxygen permeate which is mixed with a hydrocarbon containing stream and steam. Steam, one or more hydrocarbons and permeated oxygen is reacted to produce a synthesis gas. Hydrogen is separated from the synthesis gas by a hydrogen transport membrane to produce a hydrogen permeate which after cooling is used to form a hydrogen product stream. The hydrogen-depleted crude synthesis gas is then combusted to heat the incoming oxygen containing feed.

20 Claims, 5 Drawing Sheets

HYDROGEN PRODUCTION METHOD

FIELD OF THE INVENTION

The present invention relates to a method of producing hydrogen in which oxygen is separated from an oxygen containing feed by an oxygen transport membrane, the oxygen is reacted with a hydrocarbon and steam to produce a synthesis gas, and the hydrogen is separated from the synthesis gas through the use of a hydrogen transport membrane. More particularly, the present invention relates to such a method in which a hydrogen-depleted crude synthesis gas is combusted to heat the oxygen containing feed.

BACKGROUND OF THE INVENTION

Hydrogen is currently used in the synthesis of many different industrial chemicals. It is expected that additional production of hydrogen will be required for fuel cells to be used in transportation and distributed power generation markets. Many of the current and future hydrogen requirements can be most economically met by the use of small-scale hydrogen plants having an output of less than about 4 million standard cubic liters per day. In this regard, the use of fuel cells in the distributed power generation market is projected to grow substantially over the next 10 to 20 years. It is expected that this market will require a large number of such small-scale hydrogen plants.

A well-known method for producing hydrogen is steam methane reforming. Hydrocarbons such as methane are reformed with steam in a steam methane reformer to produce a synthesis gas mixture containing hydrogen and carbon monoxide. In a shift reactor, carbon monoxide and steam are reacted to produce a hydrogen-rich gas containing hydrogen and carbon dioxide. The hydrogen-rich gas can be purified by pressure swing adsorption to recover pure hydrogen. As can be appreciated, the foregoing processes are conducted in large-scale installations that can be capable of producing more than 3 billion standard cubic liters of hydrogen per day.

Reactors have at least been proposed in the prior art in which steam, one or more hydrocarbons, and air are reacted to produce a synthesis gas. Hydrogen is separated from the synthesis gas by a hydrogen transport membrane. An example of such a reactor is disclosed in U.S. Pat. No. 5,741,474. In this patent, hydrogen is produced by reforming hydrocarbons with oxygen or air and steam to produce a crude synthesis gas containing hydrogen, carbon monoxide, water, and carbon dioxide. The hydrogen is recovered from the synthesis gas by use of a hydrogen transport membrane.

U.S. Pat. Nos. 4,810,485 and 5,637,259 also describe membrane reactors that integrate hydrogen generation with hydrogen separation by a membrane. In U.S. Pat. No. 4,810,485 a reactor is disclosed in which a hydrogen containing gas is produced by steam methane reforming or a water gas shift reaction and a hydrogen transport membrane is used to separate hydrogen from the hydrogen containing gas. U.S. Pat. No. 5,637,259 describes a tubular reactor and membrane to produce hydrogen from a synthesis gas produced within the reactor.

Hydrogen transport membranes, that are effective to separate hydrogen from hydrogen containing gases, include membranes made of metals or metal alloys, proton conducting ceramic materials and porous ceramic membranes. All of such membranes function at high temperatures.

In metal-based and porous ceramic membranes, hydrogen permeation is due to the higher hydrogen partial pressure on the retentate side as compared to the permeate side. Several examples of metal-based membranes in the prior art include U.S. Pat. Nos. 3,350,846, 5,215,729, and 5,738,708. The membranes of the foregoing patents are composite membranes in which a layer, formed of Group IVB or VB metals, is sandwiched between two layers of a metal selected from either palladium, platinum or their alloys. In U.S. Pat. No. 5,217,506, a composite membrane is disclosed that contains intermetallic diffusion barriers between two top layers and a central membrane layer to prevent diffusion of top metal layer into the central metal layer. The barrier is made from oxides or sulfides of molybdenum, silicon, tungsten and vanadium. U.S. Pat. No. 5,652,020 describes a hydrogen transport membrane comprised of a palladium layer deposited on porous ceramic support layer. U.S. Pat. No. 5,415,891 describes a porous ceramic membrane modified by either metallic oxide (e.g. aluminum or zirconium oxide) or non-metallic oxide (e.g. silicon oxide).

Proton conducting ceramic materials can be characterized as being either electrically-driven (a pure proton conductor) or pressure driven (a mixed conductor).

Electrically-driven membranes are pure proton conductors that do not have electrical conductivity. Such membranes need an external circuit to drive electrons from an anode surface of the membrane to cathode surface. One of the advantages of an electrically-driven membrane is that there is no need to maintain high pressure because electrical force can be used to transport hydrogen to the permeate zone and to produce pressurized hydrogen directly. A second advantage is the reduced need for a purge gas on the permeate side. Proton conducting ceramics suitable for high-temperature application include perovskite-type oxide based on cerates or zirconates as cited in H. Iwahara, "Hydrogen Pumps Using Proton Conducting Ceramics And Their Applications", Solid State Ionics 125 (1999), pp 271–278 (1999).

Pressure driven membranes capable of conducting both protons and electrons do not need external circuit and can operate in non-galvanic mode. Examples of mixed conducting, hydrogen transport membranes are disclosed in U.S. Pat. Nos. 6,066,307 and 6,037,514. U. Balachandran et al., "Development of Mixed-Conducting Ceramic Membrane for Hydrogen Separation", presented at the Sixteenth Annual International Pittsburgh Coal Conference Proceedings, Pittsburgh, Pa., Oct. 11–15, 1999 discloses that electronic conductivity can be increased by mixing metal powder with mixed conductors such as partially substituted perovskite-type oxides such as $CaZrO_3$, $SrCeO_3$ and $BaCeO_3$.

Other prior art reactor designs, in addition to the hydrogen transport membrane, incorporate an oxygen transport membrane to produce oxygen for partial oxidation reactions that provide heat for the endothermic steam methane reforming reaction. For instance, in the reactor design shown in U.S. Pat. No. 6,066,307, hydrogen is produced from partial oxidation and steam methane reforming reactions of a hydrocarbon fuel, steam, and oxygen using a reactor containing oxygen transport membranes to produce the oxygen and hydrogen transport membranes to separate hydrogen from a crude synthesis gas. As the hydrogen is removed, the shift conversion reaction results in additional hydrogen generation. An oxygen containing feed, composed of air, is heated by three streams, composed respectively of oxygen-depleted air, hydrogen-depleted crude synthesis gas, and hydrogen returning from the reactor. In a reaction zone of the reactor, oxygen from the heated air permeates through the oxygen transport membrane and reacts with a mixture of a hydrocarbon containing fuel and steam to produce the synthesis gas. Hydrogen from the reaction zone permeates through the hydrogen transport membrane. The oxygen-depleted air, hydrogen-depleted crude synthesis gas, and the hydrogen are cooled to recover thermal energy and thereby heat the incoming feed and in turn help heat the membranes to their operational temperatures.

It is to be noted that oxygen transport membranes function by transporting oxygen ions, formed from oxygen at a surface of the membrane known as the cathode side, to the opposite surface of the membrane, known as the anode side. The oxygen molecule is reconstituted at the anode side and electrons lost from the oxygen ions upon reconstitution of the oxygen are transported to the cathode side for oxygen ionization.

There are membrane materials, referred to as mixed conductors, that can conduct oxygen ions as well as electrons. Various known perovskites are suitable for such purposes. There are also dual phase metal and metallic oxide combinations that can also be used. Examples of mixed conductors and dual phase combinations can be found in U.S. Pat. Nos. 5,702,999, 5,712,220 and 5,733,435. All of such membranes operate at an elevated temperature, between about 400° C. and about 1000° C. and in the pressure-driven mode, that is, the partial pressure of oxygen on the cathode side of the membrane is higher than on the anode side.

In all of the reactor designs discussed above heat produced from partial oxidation reactions of the hydrocarbon containing feed help to balance the endothermic heat requirements of reforming reactions and the heating requirements for hydrogen transport membranes and oxygen transport membranes where the same are employed. It is to be noted that hydrogen recovery is reduced to the extent that partial oxidation reactions are used to meet heating requirements due to the production of water and carbon dioxide in the crude synthesis gas resulting from such reactions. The reason for this is that the presence of water and carbon dioxide reduce the partial pressure of the hydrogen. In addition, increased carbon dioxide levels drives the shift conversion reaction in the reverse direction which reduces the hydrogen available for separation. Therefore, heat recovery from the discharged streams, for instance, hydrogen-depleted crude synthesis gas, hydrogen product streams, and oxygen depleted retentate streams, is particularly critical.

In the prior art, such heat recovery is through indirect heat exchange that is effectuated by the use of heat exchangers. Such heat exchangers add to the complexity and cost of the use of reactors discussed above and therefore, do not make them very amenable for use in small-scale hydrogen production. For instance, in the plant described in U.S. Pat. No. 6,066,307, three streams from the reactor, made up of an oxygen depleted retentate, hydrogen product, and hydrogen-depleted crude synthesis gas, must be separately cooled. Therefore, three additional, separate heat exchangers are required. Furthermore, two heat exchangers (economizer and boiler) are used for steam generation, one heat exchanger is required for preheating the hydrocarbon feed to the desulfurization temperature and one heat exchanger is needed to preheat the feed to reactor temperature. Thus, a total of seven heat exchangers are required to practically carry out the teachings of this patent.

Even in reactors that do not employ an oxygen transport membrane, there is still a practical requirement for the utilization of a number separate heat exchange devices. For instance, in U.S. Pat. No. 5,741,474, an annular combustion chamber surrounds the reactor to combust a mixture of part of the hydrocarbon feed to be reacted, the hydrogen-depleted crude synthesis gas, and part of the incoming air feed. In addition, two separate heat exchangers are employed to recover heat to separately heat the incoming air and hydrocarbon feeds to the reactor.

As will be discussed, the present invention provides a hydrogen generation method that inherently is less complex and therefore, more useful for small-scale hydrogen generation plants than prior art processes and methods discussed above.

SUMMARY OF THE INVENTION

The present invention provides a method of producing hydrogen in which oxygen is separated from an oxygen containing feed stream with an oxygen transport membrane to produce an oxygen permeate. A heated oxygen permeate is reacted with one or more hydrocarbons, contained in a hydrocarbon containing feed stream, and steam, contained in a steam feed stream, to produce a crude synthesis gas comprising hydrogen, carbon monoxide, water, and carbon dioxide. The hydrogen is separated from the crude synthesis gas in a hydrogen transport membrane to produce a hydrogen-depleted crude synthesis gas and a hydrogen permeate. A product stream is formed that contains hydrogen from the hydrogen permeate. A stream of the hydrogen-depleted crude synthesis gas in the presence of an oxygen-containing feed stream is combusted, thereby to form the heated oxygen-containing feed stream.

Separation of the oxygen from the oxygen containing feed stream forms an oxygen depleted retentate. The hydrocarbon containing feed stream can be preheated and the steam contained in the steam feed stream can be produced through indirect heat exchange with a retentate stream composed of the oxygen depleted retentate.

The partial pressure of hydrogen can be reduced through the use of a sweep gas composed of steam. The steam and water resulting from the use of the sweep gas can be removed from a hydrogen permeate stream composed of the hydrogen permeate to form the product stream. Preferably, the steam within the sweep gas stream is superheated, a make-up water stream, provided for make-up of the steam, is preheated, and the hydrocarbon containing gas stream is preheated through indirect heat transfer with the hydrogen permeate stream. The water is removed from the hydrogen permeate stream after the indirect heat transfer by condensing the water and separating the condensed water in a phase separator.

Ethane and other higher order hydrocarbons contained within the hydrocarbon containing feed stream can be pre-reformed to methane prior to reacting the oxygen permeate with the hydrocarbon and the steam. Other pretreatment can include removing sulfur from the hydrocarbon containing feed stream. Part of the hydrogen produced can be added to the hydrocarbon containing feed stream.

In a specific embodiment of the present invention, the oxygen can be separated from the oxygen containing gas and synthesis gas can be generated in a first reaction stage. A synthesis gas stream formed from the synthesis gas can be introduced into a second reaction stage to separate the hydrogen from the synthesis gas and thereby to produce the hydrogen-depleted crude synthesis gas. The steam for the steam feed stream can be produced through indirect heat exchange with the synthesis gas stream. In such embodiment, the hydrocarbon containing feed stream and an air stream to supply the air for combustion of the hydrogen-depleted crude synthesis gas are preheated through heat exchange with a retentate stream composed of an oxygen depleted retentate formed by separation of the oxygen from the oxygen containing feed stream. A make-up water stream, provided for make-up of the steam, is preheated, and the hydrocarbon containing gas stream is preheated through indirect heat transfer with the hydrogen permeate stream.

The oxygen containing feed stream can be compressed to a sufficiently high pressure to allow for the recovery of work. In this regard, separation of the oxygen from the heated oxygen containing feed stream produces an oxygen-depleted retentate. An oxygen-depleted retentate stream composed of the oxygen-depleted retentate is expanded with the performance of work. The work may be extracted as electrical power and/or drive a compressor or blower.

In any embodiment of the present invention, the hydrogen transport membrane can be a metal membrane or a proton conducting membrane or a porous ceramic membrane. The oxygen transport membrane can be formed from a mixed conductor membrane or a dual phase mixed metal and metal oxide membrane.

In absence of the present invention, the obvious choice for small-scale hydrogen production is to flare hydrogen-depleted crude synthesis gas after recovering the thermal energy. However, it is difficult to flare the gas because of its low thermal energy and low Btu content. In any event, flaring will represent an energy loss from the plant. In this regard, if the hydrogen-depleted crude synthesis gas is sent to the flare at a high temperature to facilitate combustion, there will be even greater losses of both thermal and fuel energy. Thus, the use in the present invention of hydrogen-depleted crude synthesis gas as a fuel to preheat air or other oxygen containing gas, not only utilizes both its fuel and thermal energy and solves problem of flaring of low grade fuel gas but also simplifies apparatus by reducing the number of heat exchangers. Furthermore, combustion of the hydrogen-depleted, crude synthesis gas produces more heat per mole of oxygen consumed than other fuels. Since the oxygen containing gas is the source of oxygen in the production of the synthesis gas, it is important to conserve oxygen molecules during combustion.

BRIEF DESCRIPTION OF THE DRAWINGS

While the specification concludes with claims distinctly pointing out the subject matter that the inventors regard as their invention, it is believed the invention will be better understood when taken in connection with the accompanying drawings in which:

The same reference numerals are used in the drawings to indicate elements having the same or similar function to reduce the amount of repetitive explanation of the function of such elements.

DETAILED DESCRIPTION

Figure 1:
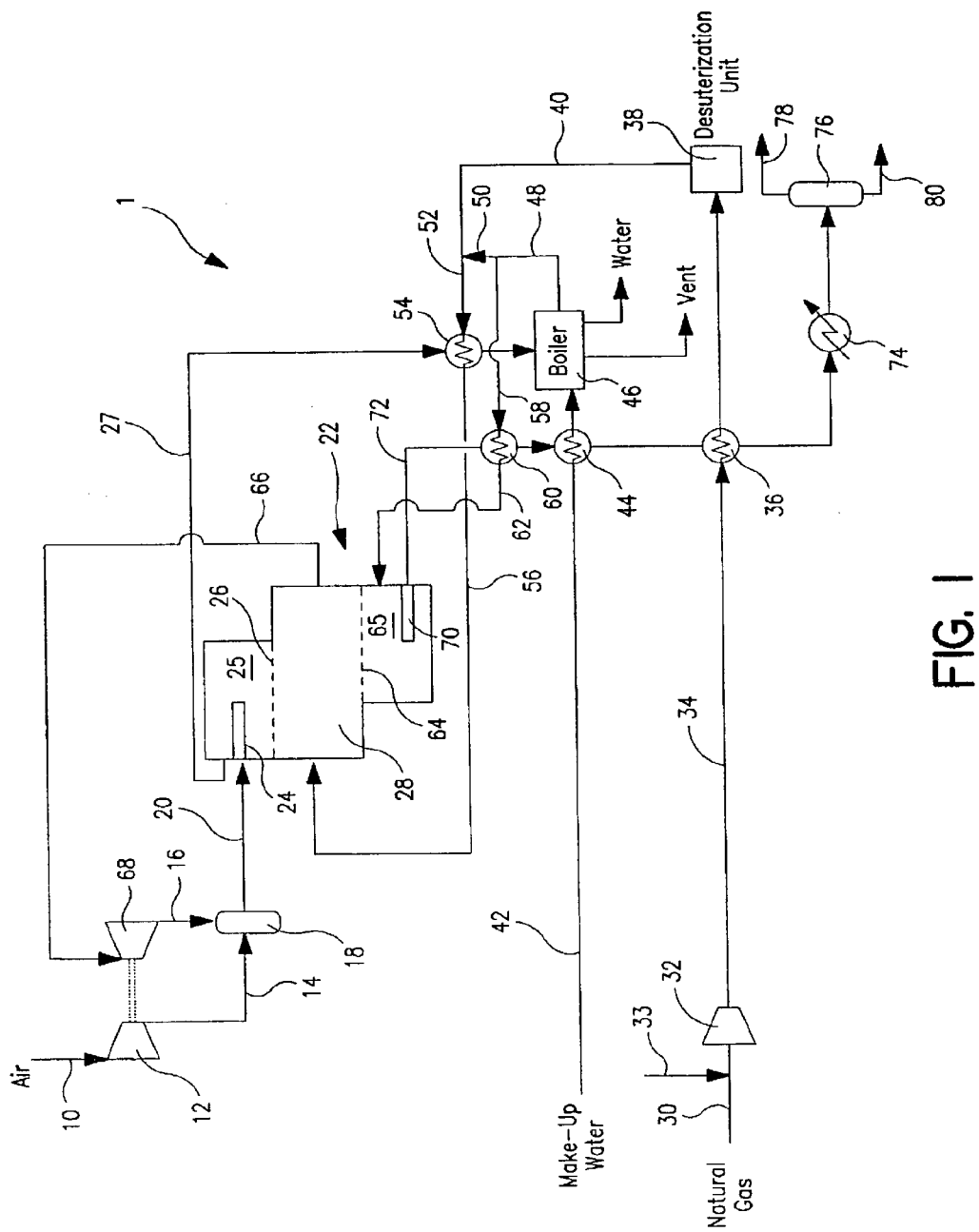
FIG. 1 is a schematic illustration of an apparatus for carrying out a process in accordance with the present invention.

FIG. 1 illustrates an apparatus 1 for producing hydrogen in accordance with the present invention. An oxygen containing feed stream 10 is introduced into a blower 12 that raises the pressure of the oxygen containing feed stream 10 to a pressure that can be in a range of between about 20 psia and about 50 psia to overcome piping loss. Oxygen containing feed stream 10 can be air or any other feed containing oxygen in a combined or non-combined form. After blower 12, the oxygen containing feed stream is designated by reference number 14.

Oxygen containing feed stream 14 and a hydrogen-depleted crude synthesis gas stream 16 are introduced into a combustion chamber 18 to combust the hydrogen-depleted crude synthesis gas stream. This produces a heated oxygen containing feed stream 20.

Heated oxygen containing feed stream 20 is introduced into a reactor 22 through one or more lance tubes 24 projecting into the cathode side 25 of one or more oxygen transport membranes 26. Oxygen is separated by oxygen transport membrane 26 and is thereby introduced, as an oxygen permeate, into a reaction chamber 28 defined in part by the anode side of oxygen transport membrane 26. The retentate formed at the cathode side 25 is discharged as an oxygen depleted stream 27.

A hydrocarbon containing feed stream 30 is compressed by a compressor 32 to produce a compressed hydrocarbon containing feed stream 34 that can have a pressure in a range of between about 100 psia and about 1000 psia. Hydrocarbon containing feed stream 30 can be a natural gas stream and as such can contain a variety of hydrocarbons. As indicated, a hydrogen recycle stream 33 containing hydrogen produced by the process described herein can be added to hydrocarbon containing feed stream 34 prior to compression. Hydrogen recyle stream 33 preferably constitutes no more than about 5% by volume of the hydrogen production contemplated herein.

The resultant compressed hydrocarbon containing feed stream 34 is heated within a heat exchanger 36 to a temperature that can be in a range of between about 300° F. and about 700° F. and is then desulfurized within a known desulfurization unit 38 to produce a desulfurized hydrocarbon containing feed stream 40. Desulfurization unit 38 consists of a fixed bed with layers of Co—Mo and ZnO to remove sulfur compounds. The Co—Mo layer converts complex organic sulfur compounds into hydrogen sulfide by hydrotreating reactions with hydrogen and the ZnO layer removes the hydrogen sulfide.

A make-up water stream 42 is preheated within a heat exchanger 44 and is then further heated within a boiler 46 to produce a make-up steam stream 48. Make-up steam stream 48 is divided into first and second subsidiary steam streams 50 and 58. First subsidiary steam stream 50 is combined with desulfurized hydrocarbon containing feed stream 40 to produce a reactant feed stream 52 that is preheated within heat exchanger 54, preferably to a temperature of between about 1000° F. and about 1800° F., and introduced as a heated reactant feed stream 56 into reaction chamber 28 of reactor 22. It is to be noted that heat exchanger 54 could be an integral part of the reactor (reaction chamber 28, oxygen and hydrogen transport membranes 26 and 64, and etc.) The advantage of using an integral heat exchanger is that the temperature of streams entering and leaving the reactor would be much below the temperature within reaction chamber 28. As a result, less expensive materials could be used for the construction of nozzles and pipes connected to the reactor.

Oxygen depleted stream 27 is used to supply heat to heat exchanger 54 and boiler 46. After serving such purpose, oxygen depleted stream 27 is vented. Note: Blowdown water is removed from the boiler to control the buildup of solids that precipitate when water is vaporized. Second subsidiary steam stream 58 is superheated within heat exchanger 60 to form a sweep gas stream 62 that will be discussed hereinafter.

Within reaction chamber 28, the oxygen permeate, steam, and the hydrocarbon(s) react to produce a crude synthesis gas that, among other substances, contains hydrogen and carbon monoxide. Specifically, the oxygen permeate reacts with hydrocarbon(s) in the reaction chamber 28 by a partial oxidation reaction to generate the synthesis gas (primarily a mixture of carbon monoxide and hydrogen). The representative reaction is as follows:

$$C_mH_n+m/2O_2 \rightarrow mCO+n/2H_2$$

A reforming reaction also takes place between hydrocarbon and steam to generate more synthesis gas. The reforming reaction is as follows:

$$C_mH_n+mH_2O \rightarrow mCO+(m+n/2)H_2$$

The exothermic reaction of partial oxidation is partially offset by the endothermic reaction of hydrocarbon-steam reforming. The water-gas shift reaction, which is slightly exothermic also take place in the reaction zone. The partial oxidation reaction produces less hydrogen from a mole of methane than does the steam reforming reaction (2 moles versus 3 moles) and the same amount of CO. Consequently, after undergoing the shift conversion reaction more hydrogen is available from the reforming reaction products than from the partial oxidation reaction products. The following is the water-gas shift reaction:

$$CO+H_2O \rightarrow H_2+CO_2$$

The heat from the shift reaction is also used for the reforming reaction described above. Preferably, the temperature of the reaction chamber 28 is controlled to be between about 1300° F. and about 2000° F.

A suitable reforming catalyst, such as nickel, is preferably provided within reaction chamber 28 to promote the reforming reactions.

The hydrogen is separated from the synthesis gas through the use of one or more hydrogen transport membranes 64 (fabricated from any of the known materials described hereinabove) having retentate sides located within reaction chamber 28. Hydrogen is transported across the hydrogen transport membrane 64 from the reaction zone 28 to a permeate side 65 thereof. The introduction of sweep gas stream 62 to permeate side 65 of hydrogen transport membrane 64 lowers the partial pressure of hydrogen permeate to in turn increase the driving force for the separation and the recovery. The removal of hydrogen pushes the reforming and shift reactions in the forward direction and results in more hydrogen production.

It is to be noted, that since the oxygen is consumed by the reaction as soon as it reaches the anode side within reaction chamber 28, the partial pressure of oxygen within the reaction chamber 28 is very low (near zero). Because of the very low partial pressure, it is possible to supply air or other oxygen containing gas at near ambient pressure (~20 psia) to the cathode side 25 of the oxygen transport membrane 26 and maintain the total pressure in reaction chamber 28 at a much higher level (up to 1000 psia) and still transport oxygen.

Oxygen transport membrane 26 can be a dense phase or a thin film supported on a porous support. The thickness of a membrane layer can be less than about 5000 microns, preferably less than about 1000 microns, most preferably less than about 150 microns. The membrane can be made in tubular or planar form. Although a pressure-driven membrane (fabricated from known materials described hereinabove) is preferable for the present invention, it is also possible to use electrically-driven oxygen ion conducting membrane that does not have electronic conductivity. In such case an external electric circuit for the return of electrons would have to be provided.

The hydrogen separation produces a hydrogen-depleted crude synthesis gas stream 66 which after expansion in a turboexpander 68 is introduced as hydrogen-depleted crude synthesis gas stream 16 into reaction chamber 18. The work of expansion produced within turboexpander 68 can be applied to the compression of incoming oxygen containing feed stream 10 by way of an electrical generator or other known coupling.

The hydrogen permeate produced within hydrogen transport membrane is withdrawn by way of lance tube 70 to produce a hydrogen permeate stream 72. Hydrogen permeate stream 72 is successively passed through heat exchangers 60, 44 and 36 to thereby superheat second subsidiary steam stream 58, preheat make-up water stream 42, and preheat compressed hydrocarbon containing feed stream 34, respectively. Hydrogen permeate stream 72 can be further cooled within an aftercooling unit 74 to condense out any water. Hydrogen permeate stream 72 is then introduced into a phase separator 76 to produce a hydrogen product stream 78 and a water stream 80.

Figure 2:
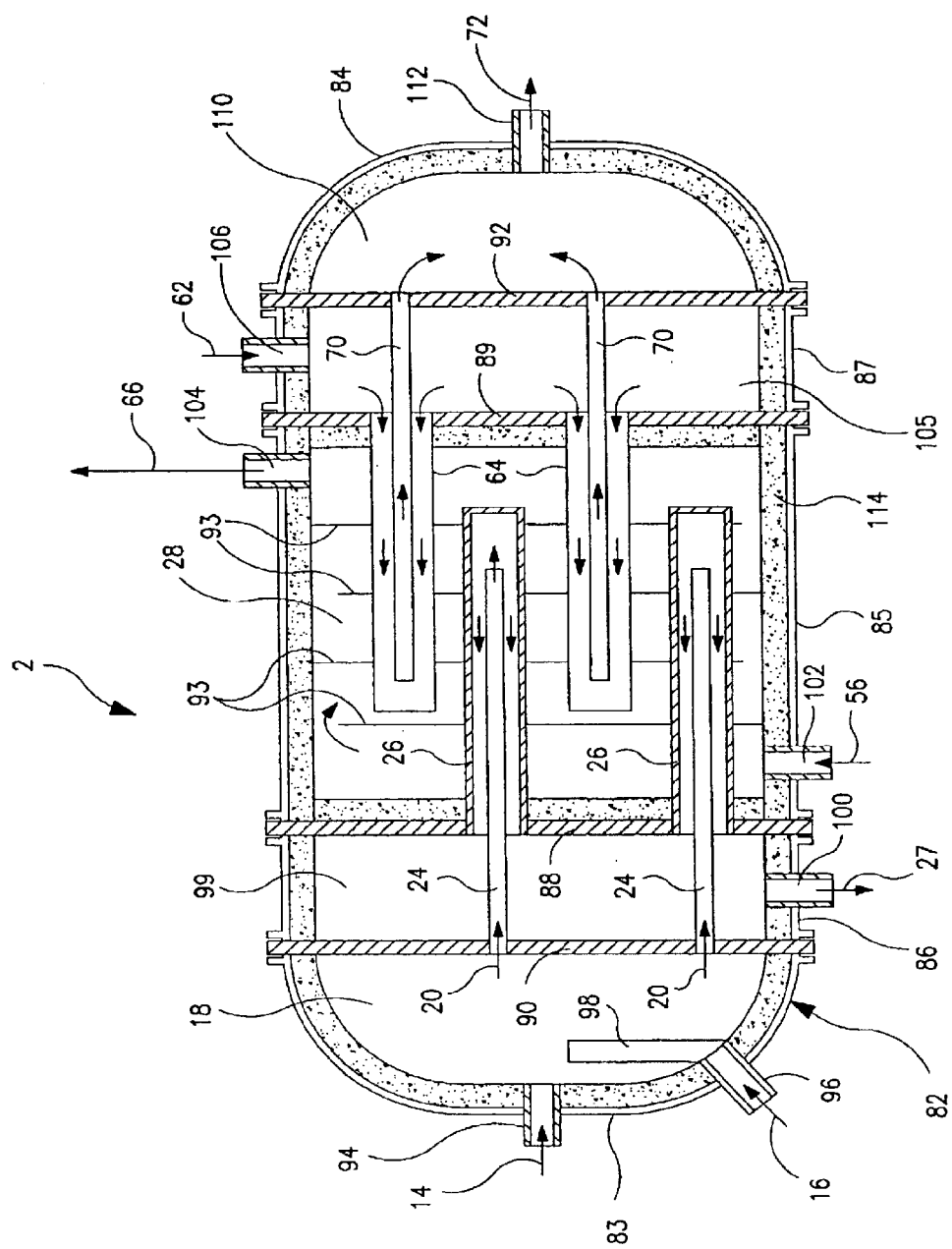
FIG. 2 is an elevational, cross-sectional view of an apparatus used in carrying out the process illustrated in FIG. 1.

With reference to FIG. 2, an apparatus 2 is illustrated that advantageously combines reactor 22 and combustion chamber 18 within with reaction vessel 82. Reaction vessel 82 has opposed end sections 83 and 84, a central section 85, a intermediate section 86 connecting end section 83 to central section 85, and a intermediate section 87 connecting end section 84 to central section 85. Oxygen transport membranes 26 and hydrogen transport membranes 64, in the form of tubes closed at one end, are attached to and are thereby supported by tube sheets 88 and 89, respectively, within reaction vessel 82. Lance tubes 24 and 70 project into oxygen transport membranes 26 and hydrogen transport membranes 64, respectively, and are supported by tube sheets 90 and 92.

As illustrated, reaction chamber 28 is formed between tube sheets 88 and 89 in an overlapping region of oxygen and hydrogen transport membranes 26 and 64. It is to be noted, that an embodiment could be fabricated without an overlap of oxygen and hydrogen transport membranes 26 and 64 so that synthesis gas generation and hydrogen separation took place in series. Baffle plates 93 produce a cross flow of reactants. Reaction chamber 28 may contain suitable nickel catalysts to promote reforming reactions. The catalyst can be in the form of a pebble bed, a coated monolith structure or a porous layer attached to the outside of oxygen transport membranes 26.

Heated oxygen containing feed stream 14 is introduced into an inlet 94 of combustion chamber 18, formed within end section 83 of reaction vessel 82. Hydrogen-depleted crude synthesis gas stream 16 is introduced into an inlet 96 and pipe 98 projecting into combustion chamber 18. The combustion produces heated oxygen containing feed 20 that is introduced into oxygen transport membranes 26 through lance tubes 24. The resultant oxygen depleted stream 27 is collected within chamber 99, formed by intermediate section 86, and is discharged through a discharge outlet 100.

Heated reactant feed stream 56 is introduced into reaction chamber 28 by way of an inlet nozzle 102. The hydrogen-depleted crude synthesis gas stream 66 is discharged from reaction chamber 28 through an outlet nozzle 104. At the same time, sweep gas stream 62 is introduced into the permeate side 65 of hydrogen transport membranes 64 through chamber 105, formed from intermediate section 87, through inlet nozzle 106. The hydrogen permeate is collected within a chamber 110, formed from end section 84, and is discharged through outlet nozzle 112 as hydrogen permeate stream 72.

Reaction vessel 82 is fully lined with a ceramic thermally insulating material 114 and therefore can be formed from ordinary material of construction such as steels and stainless steels.

An advantage of the illustrated construction is that oxygen depleted stream 27 as it leaves a region of the oxygen transport membranes 24 near the open ends thereof is cooled by heat exchange with heated reactant feed stream 56. Such region of oxygen transport membranes 26 might be fabricated from a metal to facilitate the heat exchange. As a result of the cooling, the temperature of tubesheets 88 and 90 can be maintained below the temperature of reaction chamber 28. In operation, preferably, heated reactant feed stream 56 is fed into inlet nozzle 102 at a temperature in a range below the temperature of reaction chamber 28, preferably below 1500° F. and more preferably below 1100° F. This also helps to keep the temperature of tubesheet 88 below the temperature of reaction chamber 28. Furthermore, sweep gas stream 62 is fed at temperatures preferably lower than about 1100° F. to lower the temperature of tubesheet 89. The cooler temperatures reduces stresses on tubesheet metal and also helps to promote sealing between the tubesheets and the oxygen and hydrogen transport membranes 26 and 64.

Figure 3:
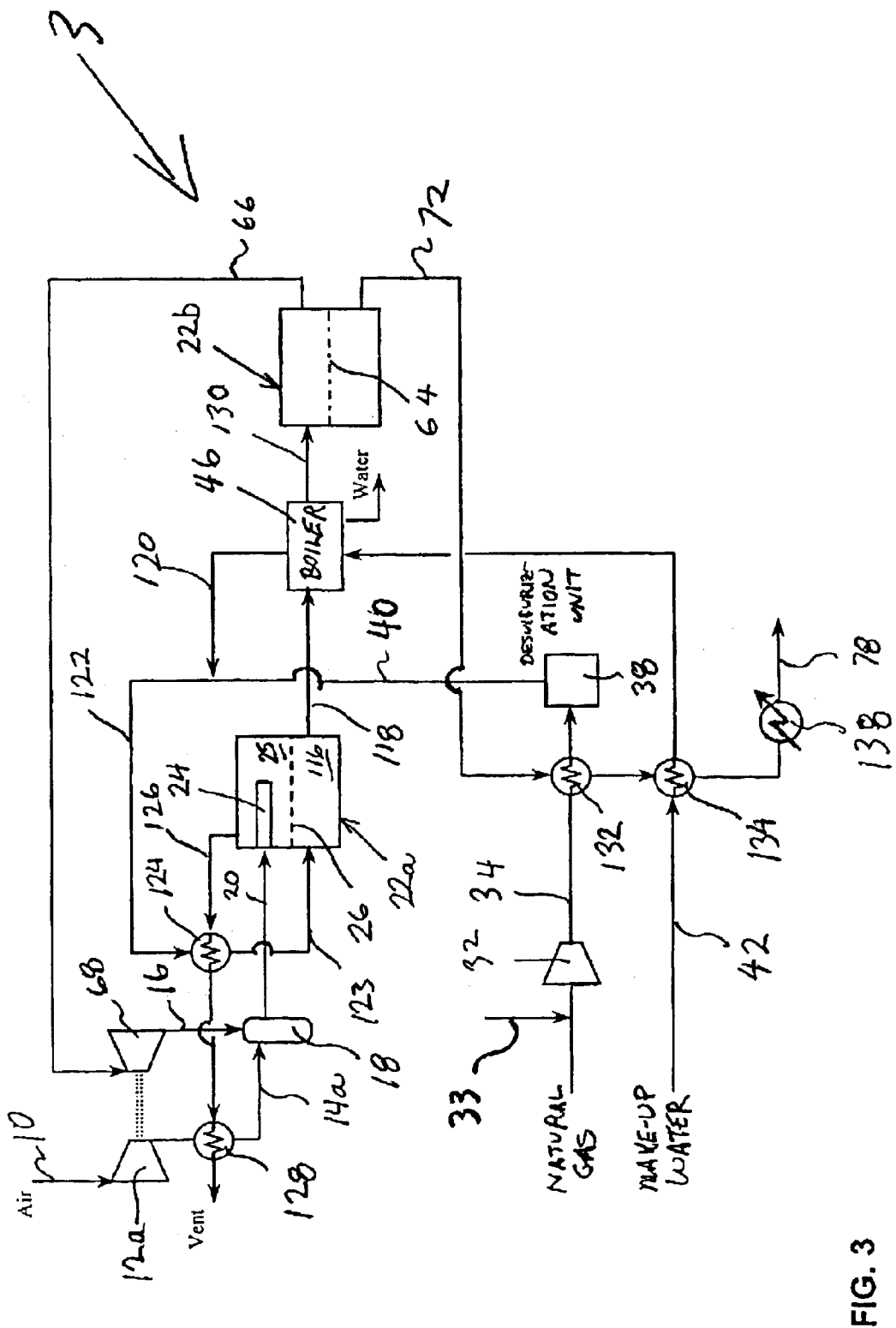
FIG. 3 is a schematic illustration of an alternative embodiment of an apparatus for carrying out a process in accordance with the present invention.

With reference to FIG. 3, an apparatus 3 is illustrated for carrying out a method in accordance with the present invention. Apparatus 3 is particularly useful when the desired operating temperature of hydrogen transport membrane 64 is lower than that of the oxygen transport membrane 26. This is the case when palladium and its alloys are used for hydrogen separation and the preferable operating temperature for such membranes is between about 600° F. and about 1300° F.

In this embodiment of the present invention, reactors 22a and 22b are utilized in place of reactor 22. It should be mentioned that reactors 22a and 22b are reaction stages that could be reaction zones or stages of the same reactor. In reactor 22a synthesis gas generation occurs and in reactor 22b, hydrogen separation occurs along with some water shift reactions.

Oxygen containing feed stream 10 is compressed by a compressor 12a and then heated within a heat exchanger 128 to a temperature of between about 600° F. and about 1100° F. After heating and compression, oxygen containing feed stream, designated by reference number 14a, is introduced into combustion chamber 18. The resulting heated oxygen containing feed 20 is introduced into a cathode side 25 of an oxygen transport membrane 26 via a lance tube 24 to produce an oxygen permeate at an anode side 116 of oxygen transport membrane 26. A crude synthesis gas stream 118 is introduced into boiler 46 for heating make-up water stream 42 into a steam stream 120 which is combined with the desulfurized feed stream 40 to produce a reactant feed stream 122 containing hydrocarbons and steam. Reactant feed stream 122 is then preheated to form a heated reactant feed stream 123 within a heat exchanger 124 through indirect heat exchange with an oxygen-depleted retentate stream 126. Oxygen-depleted retentate stream 126 is subsequently passed through a heat exchanger 128 to preheat oxygen containing feed stream 14.

Heated reactant feed stream 123 is passed into the anode side 116 of oxygen transport membrane 26 to mix with and react with permeated oxygen, thereby to produce the crude synthesis gas stream 118. Crude synthesis gas stream can have a temperature in a range of between about 1400° F. and about 2000° F. After boiler 46, the resultant partly cooled crude synthesis gas stream 130, which can have a temperature in a range of between about 600° F. and about 1300° F., is introduced into one or more hydrogen transport membranes 64 contained within reactor 22b to produce hydrogen-depleted crude synthesis gas stream 66 and hydrogen permeate stream 72. Reactor 22b can contain a suitable catalyst, for example chromia to promote any remaining shift reaction occurring in reactor 22b.

Hydrogen permeate stream 72 is introduced into a heat exchanger 132 to preheat the hydrocarbon containing feed stream 34. Thereafter, hydrogen permeate stream 72 is passed into a heat exchanger 134 to preheat make-up water stream 42. Hydrogen permeate stream 72 is cooled within an aftercooler 138 to produce the hydrogen product stream 78.

Figure 4:
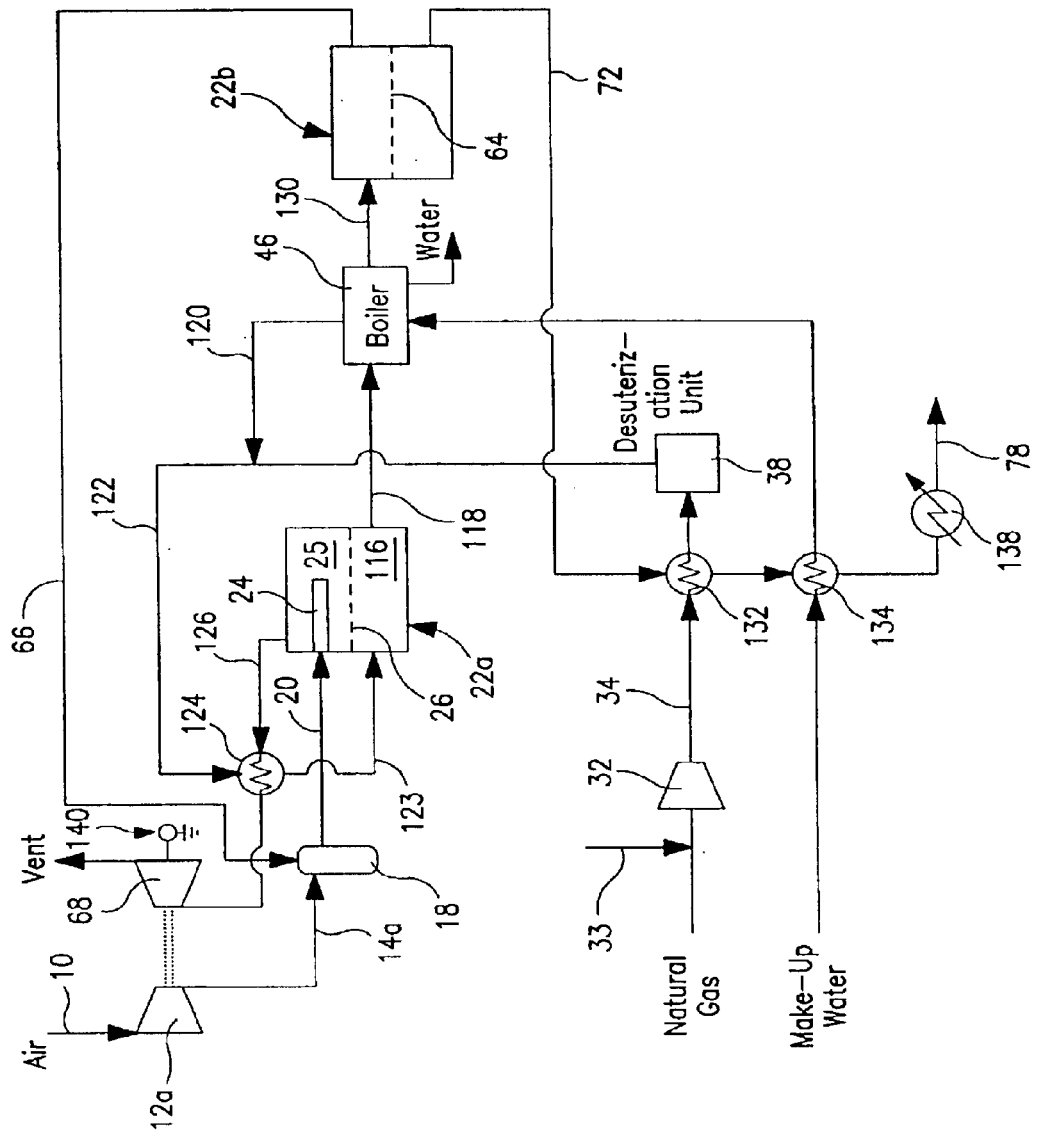
FIG. 4 is a schematic illustration of the alternative embodiment illustrated in FIG. 3 that is suitably modified to generate power.

With reference to FIG. 4, an apparatus 4 is illustrated to generate hydrogen and power. It is, by in large, identical in layout to apparatus 3 shown in FIG. 3 with the deletion of heat exchanger 128 and the provision for passage of retentate stream 126 directly into turboexpander 68 from which power is extracted as shown by reference numeral 140 by, for instance, an electrical generator.

In such embodiment, oxygen containing feed stream 10 is compressed to a pressure greater than that of foregoing embodiments, preferably between about 150 psia and about 350 psia, in compressor 12a and then fed to combustor 18 as stream 14 without preheating. Hydrogen-depleted crude synthesis gas stream 66 is fed directly into combustion chamber 18 without expansion. Oxygen-depleted stream 126 is obtained at a pressure of between about 125 psia and about 325 psia from reactor 22a and is optionally cooled in heat exchanger 124. Oxygen depleted stream 126 is expanded within turboexpander 68 to produce work that is used in powering compressor 12a and to also produce power that as mentioned above can be exported.

Figure 5:
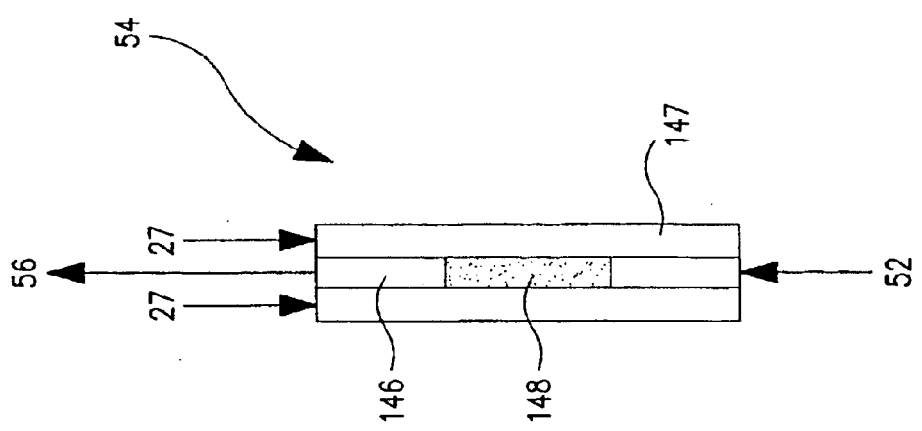
FIG. 5 is a fragmentary elevational, cross-sectional view of a heat exchanger having passages containing catalyst for pre-reforming a hydrocarbon containing feed having hydrocarbons of higher order than methane.

In any of the embodiments of the present invention where the hydrocarbon containing feed contains higher order hydrocarbons than methane, for instance ethane and above, the hydrocarbon containing feed can be prereformed with a pre-reforming catalyst so that the higher order hydrocarbons are reformed into methane. This reduces carbon formation in downstream piping and other equipment operating at high temperature. With reference to FIG. 5, heat exchanger 54 could be fabricated in a known manner as a double pipe exchanger having coaxial heat exchange passages 146 and 147 for the passage and indirect heat exchange between reactant feed stream 52 and oxygen-depleted retentate stream 27, respectively. Any other heat exchanger design could be used, for instance, shell-and-tube or plate-and-fin. A pre-reforming catalyst 148, such as supported nickel, could be inserted into heat exchange passages 146, to pre-reform reactant feed stream 52. In the illustrated embodiment, pre-reforming catalyst 148 is centrally located within each heat exchange passage 146 so that reactant feed stream 52 is initially preheated to a temperature in a range of between about 800° F. and about 1000° F. so that it is pre-reformed at such temperature to avoid carbon formation. After the catalyst, reactant feed stream 52 is further heated preferably between about 1100° F. and about 1500° F. to form heated reactant feed stream 56.

Embodiments are possible, however, in which heat exchange passages 146 are filled with pre-reforming catalyst 148.

Figure 6:
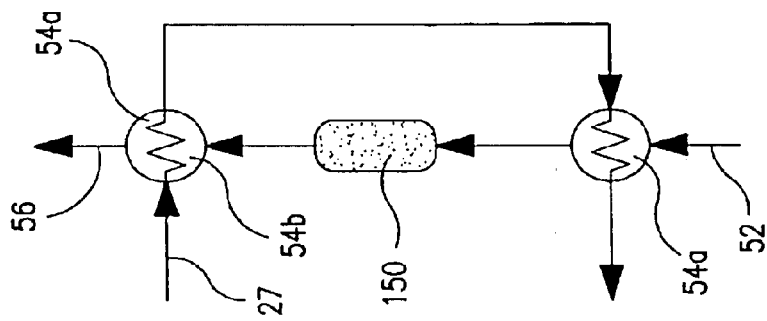
FIG. 6 is a schematic illustration of a prereformer integrated into the apparatus shown in FIG. 1.

With reference to FIG. 6, the preforming could be carried out by separately carrying out the heat exchange of reactant feed 52 in two heat exchangers 54a and 54b, separated by a catalyst bed 150. Reactant feed stream 52 is initially passed through a heat exchanger 54a to heat such stream to pre-reforming temperature. Reactant feed stream after being preheated, it then introduced into catalyst bed 150 to reform higher order hydrocarbons and is thereafter finally heated within heat exchanger 54b to form heated reactant feed stream 56.

While the present invention has been described in reference to a preferred embodiment, as will occur to those skilled in the art, numerous changes, additions and omissions may be made without departing from the spirit and scope of the present invention.

We claim:

1. A method of producing hydrogen comprising:

separating oxygen from a heated oxygen containing feed stream with an oxygen transport membrane to produce an oxygen permeate;

reacting said oxygen permeate, a hydrocarbon contained in a hydrocarbon containing feed stream, and steam contained in a steam feed stream in partial oxidation and reforming reactions to produce a crude synthesis gas comprising hydrogen, carbon monoxide, water, and carbon dioxide;

separating said hydrogen from said synthesis gas in a hydrogen transport membrane to produce a hydrogen-depleted crude synthesis gas and a hydrogen permeate;

forming a product stream containing hydrogen composed of said hydrogen permeate; and forming the heated oxygen-containing feed stream by combusting a stream of the hydrogen-depleted crude synthesis gas in the presence of an oxygen-containing feed stream.

2. The method of claim 1, wherein:

separation of the oxygen from the oxygen containing feed stream forms an oxygen depleted retentate;

said hydrocarbon containing feed stream is preheated and steam contained in said steam feed stream is produced through indirect heat exchange with a retentate stream composed of said oxygen depleted retentate.

3. The method of claim 2, wherein:

the partial pressure of hydrogen permeate is reduced through the use of a sweep gas composed of steam; and water resulting from the use of the sweep gas is removed from a hydrogen permeate stream composed of the hydrogen permeate to form the product stream.

4. The method of claim 3, wherein:

separation of the oxygen from the oxygen containing feed stream forms an oxygen depleted retentate;

said hydrocarbon containing feed stream is preheated and said steam contained in said steam feed stream is produced through indirect heat exchange with a retentate stream composed of said oxygen depleted retentate.

5. The method of claim 4, wherein:

the steam within the sweep gas stream is superheated, a make-up water stream, provided for make-up of the steam, is preheated, and the hydrocarbon containing gas stream is preheated through indirect heat transfer with the hydrogen permeate stream; and said water is removed from the hydrogen permeate stream after the indirect heat transfer by condensing said water and separating the condensed water in a phase separator.

6. The method of claim 1 or claim 2, further comprising pre-reforming ethane and other higher order hydrocarbons contained within the hydrocarbon containing feed stream to methane prior to reacting said oxygen permeate with said hydrocarbon and said steam.

7. The method of claim 5, further comprising pre-reforming ethane and other higher order hydrocarbons, contained within the hydrocarbon containing feed stream to methane, prior to reacting said oxygen permeate with said hydrocarbon and said steam.

8. The method of claim 7, further comprising removing sulfur from the hydrocarbon containing feed stream.

9. The method of claim 7, comprising adding a part of said hydrogen to the hydrocarbon containing feed stream.

10. The method of claim 1 or claim 2, further comprising adding a part of said hydrogen to the hydrocarbon containing feed stream.

11. The method of claim 1 or claim 2, wherein:

the oxygen is separated from the oxygen containing gas and synthesis gas is generated in a first reaction stage;

a synthesis gas stream formed from the synthesis gas is introduced into a second reaction stage to separate the hydrogen from the synthesis gas and thereby to produce the hydrogen-depleted crude synthesis gas; and the steam for the steam feed stream is produced through indirect heat exchange with said synthesis gas stream.

12. The method of claim 11, wherein:

the hydrocarbon containing feed stream and an air stream to supply the air for combustion of the hydrogen-depleted crude synthesis gas are preheated through heat exchange with a retentate stream composed of an oxygen depleted retentate formed by separation of the oxygen from the oxygen containing feed stream; and a make-up water stream, provided for make-up of the steam, is preheated, and the hydrocarbon containing gas stream is preheated through indirect heat transfer with the hydrogen permeate stream.

13. The method of claim 12, further comprising removing sulfur from the hydrocarbon containing feed stream.

14. The method of claim 11, further comprising adding a part of the hydrogen to the hydrocarbon containing feed gas stream.

15. The method of claim 11, further comprising pre-reforming ethane and other higher order hydrocarbons, contained within the hydrocarbon containing feed stream, to methane prior to reacting said oxygen permeate with said hydrocarbon and said steam.

16. The method of claim 15, wherein:

the hydrocarbon containing feed stream and an air stream to supply the air for combustion of the hydrogen-depleted crude synthesis gas are preheated through heat exchange with a retentate stream composed of an oxygen depleted retentate formed by separation of the oxygen from the oxygen containing feed stream; and a make-up water stream, provided for make-up of the steam, is preheated, and the hydrocarbon containing gas stream is preheated through indirect heat transfer with the hydrogen permeate stream.

17. The method of claim 16, further comprising removing sulfur from the hydrocarbon containing feed stream.

18. The method of claim 17, further comprising adding a part of the hydrogen to the hydrocarbon containing feed gas stream.

19. The method of claim 11, wherein:

the oxygen containing feed stream is compressed;

separation of the oxygen from the heated oxygen containing feed stream produces an oxygen-depleted retentate; and an oxygen-depleted retentate stream composed of the oxygen-depleted retentate is expanded with the performance of work.

20. The method of claim 1 or claim 2, wherein the hydrogen transport membrane is a metal membrane or a proton conducting membrane or a porous ceramic membrane and the oxygen transport membrane is formed from a mixed conducting material or a dual phase metal and metallic oxide combination.

* * * * *